Sept. 8, 1936.  J. F. CALVERT  2,053,422
DYNAMO-ELECTRIC MACHINE
Filed Feb. 7, 1934
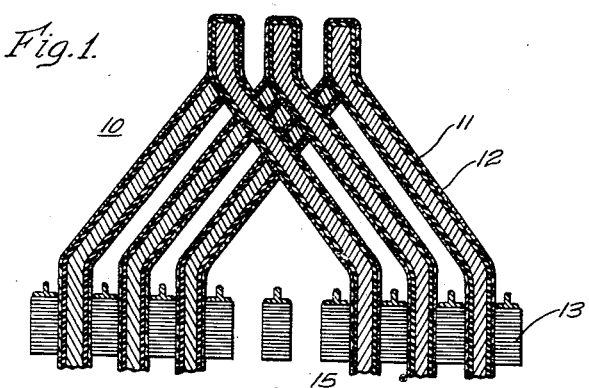
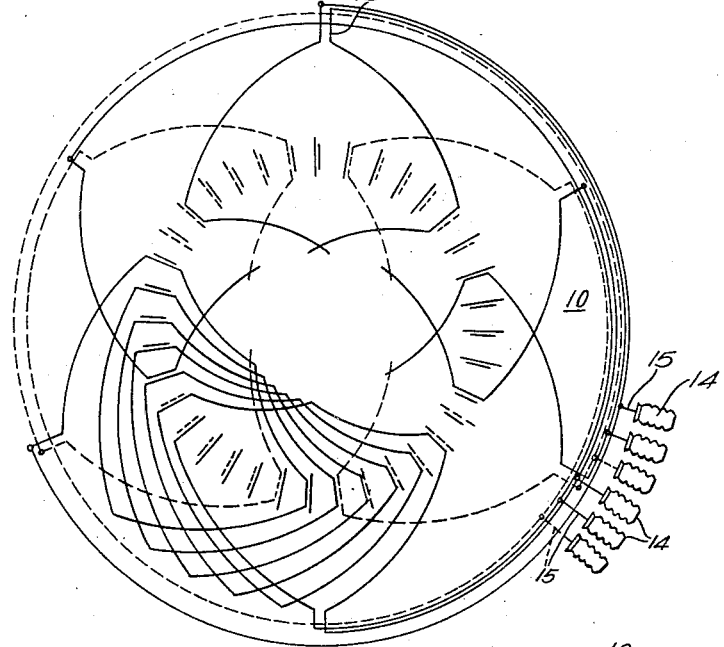
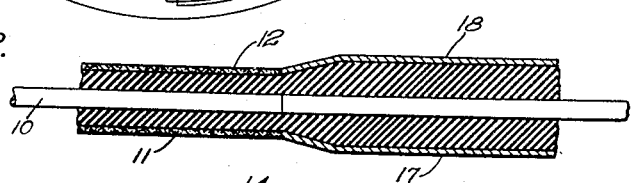
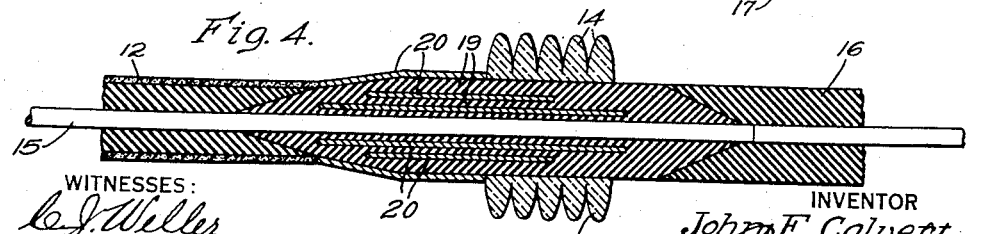
WITNESSES:
INVENTOR
John F. Calvert.
ATTORNEY Patented Sept. 8, 1936

2,053,422

UNITED STATES PATENT OFFICE 2,053,422

DYNAMO-ELECTRIC MACHINE

John F. Calvert, Irwin, Pa., assignor to Westinghouse Electric & Manufacturing Company, East Pittsburgh, Pa., a corporation of Pennsylvania Application February 7, 1934, Serial No. 710,103

4 Claims. (Cl. 171—206)

The invention relates generally to dynamo-electric machines and more particularly to the protection of the windings of dynamo-electric machines from electro-static discharges and the heating of the insulation.

The object of the invention is to provide for conducting to the armature iron or other ground the electro-static charges accumulated on the insulated conductors of the different coils of the armature windings of a dynamo-electric machine, to restrict the electro-static discharge between the different conductors and the heating of the insulation.

Other objects will in part be obvious and in part appear hereinafter.

The invention accordingly is disclosed in the accompanying drawing and comprises the features of construction, combination of elements, and arrangement of parts which will be exemplified in the structure hereinafter set forth and the scope of the application of which will be indicated in the claims.

For a fuller understanding of the nature and objects of the invention, reference may be had to the following detailed description taken in conjunction with the accompanying drawing in which:

Figure 1 is a view in section of the end loops of a winding of a dynamo-electric machine constructed in accordance with this invention.

Fig. 2 is a diagrammatic view of a three-phase winding of a dynamo-electric machine illustrating the application of the present invention.

Fig. 3 is a view in section showing the manner in which the present invention may be applied to a connection between a dynamo-electric machine and a conductor for distributing power; and, Fig. 4 is a view in section illustrating how a dynamo-electric machine constructed in accordance with this invention may be connected to a bushing for dissipating accumulated electro-static charges.

Referring now to the drawing and Figs. 1 to 3 in particular, it will be observed that the different phase windings or armature coils 10 of a multiple phase dynamo-electric machine are disposed in close proximity to one another. The windings 10 are of the usual type and are provided with heavy layers of insulating material best illustrated at 11.

In operation, electro-static charges are accumulated on the surfaces of these insulated windings. The potential of certain coils is equal to the terminal to ground voltage of the machine. When machines are designed to generate high voltages, these electro-static charges may cause discharges between the different phase windings which may cause a considerable erosion of the insulation. Even if such discharges do not seriously damage the insulation, they are objectionable because of the possible fire hazard and the generation of acids which are damaging to the insulation.

In order to restrict the electro-static discharges between the different phase windings of dynamo-electric machines, some suitable conducting material 12 is applied to the surface of the windings. A number of suitable materials are available on the market. Good results have been obtained by utilizing a conducting material known as aquadag which is a graphite suspended in water. This material is essentially a mixture of graphite and water paint. When the windings are thus coated with a conducting material such as aquadag, the accumulated electro-static charges are conducted inwardly along the end loop portions of the windings to the armature iron 13. In this manner the electro-static charges accumulated may be dissipated by conducting them off to the armature iron which is at ground potential.

In the diagrammatic showings in Fig. 2, condenser bushings 14 are provided so that the ground sheath of aquadag or other conducting material on the end loop portions and connections may be terminated here without damage to the insulation of the end loop portions and connections. As shown in Fig. 4, the aquadag 12 is applied to the windings of the dynamo-electric machine and to the conductors 15 leading to the bushings 14.

This method of connecting to the condenser bushings to dissipate the accumulation of the electro-static charges is now possible, since satisfactory joints may be made between the different conductors. This is made possible by the improvements in insulating material which enables the flowing together of the insulating materials provided on the different conductors with the result that the insulation becomes substantially mechanically homogeneous throughout and will resist substantially as high potential at that point as elsewhere in the windings or conductor 16 leading from the joint.

In the construction such as shown in Fig. 3, when the leads are brought out from the armature to a metal sheathed cable shown generally at 17, the aquadag 12 is extended to contact with the metal sheathing 18 which in most instances will be lead. In this manner the accumulated electro-static charges are conducted to the sheathing 18 and may then be dissipated in a manner that is best adapted to the operating conditions.

The bushings 14 employed for terminating the conducting sheathing are of well known construction comprising layers of insulating material such as shown at 19 in Fig. 4 and layers of tinfoil 20 superimposed on the insulating layers 19, and a bush 21. This type of structure has been found very satisfactory for dissipating electrostatic charges.

In conclusion, it is pointed out that while the illustrated example constitutes a practical embodiment of the invention, I do not limit myself to the exact details shown since modifications of the same may be considerably varied without departing from the spirit of the invention as defined in the appended claims.

I claim as my invention:

1. In a dynamo-electric machine, in combination, armature iron provided with slots, insulated multiple phase windings disposed in the armature slots and extending beyond the armature iron presenting end loop portions, a conducting material applied to the surface only of the insulation, the conducting material extending outwardly from the iron to cover completely the end turn portions to dissipate energy and prevent a discharge between the coils of the different phase windings, and means connected with the conducting material for dissipating energy.

2. In a dynamo-electric machine, in combination, armature iron provided with slots, insulated multiple phase windings disposed in the armature slots and extending beyond the armature iron presenting end loop portions, a conducting material applied to the insulation, the conducting material extending outwardly from the iron to the terminals of the machine to dissipate energy and prevent a discharge between the different phase windings, and a condenser bushing associated with the conducting material to co-operate in dissipating the electrostatic charges.

3. In a dynamo-electric machine, in combination, armature iron provided with slots, insulated armature coils disposed in the slots and extending beyond the armature iron presenting end turn portions, and a conducting material applied to the surface only of the armature coils and outwardly beyond the armature iron to the terminals of the machine to carry electrostatic charges and protect the coils from corona discharge between the turns of different phases and the heating of the insulation.

4. In a dynamo-electric machine, in combination, armature iron provided with slots, insulated multiple phase windings disposed in the armature slots and extending beyond the armature iron presenting end looped portions, a conducting material applied to the surface only of the windings to make electrical contact with the armature iron, the conducting material extending outwardly from the iron covering entirely the windings to the terminals of the machine to dissipate electrostatic charges and prevent a discharge between the turns of the different phase windings, and means connected with the conducting material applied to the windings for dissipating energy.

JOHN F. CALVERT.